United States Patent [19]

Sullivan

[11] Patent Number: 5,312,857

[45] Date of Patent: * May 17, 1994

[54] GOLF BALL COVER COMPOSITIONS CONTAINING HIGH LEVELS OF METAL STEARATES

[75] Inventor: Michael J. Sullivan, Chicopee, Mass.

[73] Assignee: Lisco, Inc., Tampa, Fla.

[*] Notice: The portion of the term of this patent subsequent to Apr. 26, 2011 has been disclaimed.

[21] Appl. No.: 819,108

[22] Filed: Jan. 9, 1992

[51] Int. Cl.$^5$ .................. C08K 5/09; A63B 37/12
[52] U.S. Cl. .................. 524/400; 524/398; 524/399; 524/908; 524/394; 273/62; 273/233; 273/234; 273/235 R; 273/DIG. 22
[58] Field of Search .............. 524/398, 399, 400, 908, 524/394; 273/62, 233, 234, 235 R, DIG. 22

[56] References Cited

U.S. PATENT DOCUMENTS

| | | | |
|---|---|---|---|
| 3,649,578 | 3/1972 | Bush et al. | 524/400 |
| 4,238,376 | 12/1980 | Wilson | 525/191 |
| 4,591,611 | 5/1986 | Jenkins et al. | 524/399 |
| 4,984,804 | 1/1991 | Yamada et al. | 524/908 |
| 4,990,574 | 2/1991 | Yamada | 525/371 |

Primary Examiner—Paul R. Michl
Assistant Examiner—Peter Szekely

[57] ABSTRACT

The present invention relates to improved cover compositions for golf ball construction. In this regard, it has been found that if high levels (i.e. greater than 10 pph resin) of metal stearates (i.e. zinc stearate, barium stearate, calcium stearate, magnesium stearate, etc.) are added to various ionomer resin formulations utilized in golf ball cover construction, the covers produced thereby exhibit similar or improved coefficient of restitution (C.O.R.) values combined with similar or reduced hardness (i.e. an increase in softness) properties. Moreover, since the metal stearates are significantly cheaper than the ionomer resins and the discovery that the metal stearates can be added at relatively high levels without detracting, and many instances enhancing the physical properties of the overall formulations, the addition of high levels of the metal stearates presents significant cost savings in the production of golf balls.

19 Claims, No Drawings

GOLF BALL COVER COMPOSITIONS CONTAINING HIGH LEVELS OF METAL STEARATES

BACKGROUND OF THE INVENTION

The present invention relates to golf balls and, more particularly, the invention concerns novel golf ball covers made from ionomer resin formulations containing high levels of metal stearates. The new low-cost formulations produce, when utilized for the production of golf ball covers, golf balls exhibiting similar or enhanced travel distance and/or playability properties while maintaining the durability characteristics necessary for repetitive play.

Ionomeric resins are polymers containing interchain ionic bonding. As a result of their toughness, durability, and flight characteristics, various ionomeric resins sold by E.I. DuPont de Nemours & Company under the trademark "Surlyn ®" and more recently, by the Exxon Corporation (see U.S. Pat. No. 4,911,451) under the trademarks "Escor ®" and the tradename "Iotek", have become the materials of choice for the construction of golf ball covers over the traditional "balata" (trans polyisoprene, natural or synthetic) rubbers. The softer balata covers, although exhibiting enhanced playability properties, lack the durability necessary for repetitive and/or continuous play.

Ionomeric resins are ionic copolymers of an olefin, such as ethylene, and a metal salt of an unsaturated carboxylic acid, such as acrylic acid, methacrylic acid, or maleic acid. In some instances, an additional softening comonomer such as an acrylic ester can also be included to form a terpolymer. The pendent ionic groups in the ionomeric resins interact to form ion-rich aggregates contained in a non-polar matrix.

Broadly, the ionic copolymers generally comprise one or more α-olefins and from about 9 to about 20 weight percent of α, β-ethylenically unsaturated mono- or dicarboxylic acid, the basic copolymer neutralized with metal ions to the extent desired. Suitable olefins for use in preparing the ionomeric resins include ethylene, propylene, butene-1, hexane-1, and the like. Unsaturated carboxylic acids include acrylic, methacrylic, ethacrylic, α-chloroacrylic, crotonic, maleic, fumaric, itaconic acids, and the like.

The ionomeric resins utilized in the golf ball industry are generally copolymers of ethylene with acrylic (i. e. Escor ® or Iotek) and/or methacrylic (i.e. Surlyn ®) acid. In addition, two or more types of ionomeric resins may be blended into the cover compositions in order to produce the desired properties of the resulting golf balls.

In the ionomeric resins, metal ions, such as sodium, zinc, magnesium, lithium, potassium, calcium, etc., are used to neutralize some portion of the acid groups in the ionic copolymers resulting in a thermoplastic elastomer exhibiting enhanced properties, i.e. improved durability, etc., for golf ball cover construction over balata. However, the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight.

As a result, while there are currently more than fifty commercial grades of ionomers available from DuPont and Exxon with a wide range of properties which vary according to the type and amount of metal cations, molecular weight, composition of the base resin (i.e. relative content of ethylene and methacrylic and/or acrylic acid groups), the degree of neutralization, etc., and wide number of additive ingredients which may be added to improve various characteristics of the cover stock compositions, including reinforcing materials such as glass fibers and inorganic fillers, softening agents such as plasticizers, and other compatible ingredients such as antistatic agents, antioxidants, stabilizers, processing acids, etc., a great deal of research continues in order to develop golf ball cover compositions exhibiting not only the improved impact resistance and carrying distance properties produced by the "hard" ionomeric resins, but also the playability (i.e. "spin") characteristics previously associated with the "soft" balata covers, properties which are still desired by the more skilled golfer.

In addition, golf ball manufacturers are continuously reviewing on a manufacturing cost basis, different compositions and processes for producing golf balls exhibiting similar or improved characteristics at substantially lower costs. This is particularly true with respect to golf ball cover compositions wherein the ionomer resins are relatively expensive (i.e. about $1.75/lb.). Consequently, various additives, such as fillers, have been added to the cover compositions. However, drastic reductions in a number of desired characteristics such as resilience (i.e. C.O.R.) are normally exhibited due to the incorporation of high levels of fillers in the ionomer formulations.

In this regard, two of the principal properties involved in the performance of golf balls are resilience and hardness. Resilience is determined by the coefficient of restitution (C.O.R.), the constant "e", which is the ratio of the relative velocity of an elastic sphere after direct impact to that before impact. As a result, the coefficient of restitution (i.e. "e") can vary from zero to one, with one being equivalent to an elastic collision and zero being equivalent to an inelastic collision.

Resilience (C.O.R.), along with additional factors such as ball size and weight, clubhead speed, angle of trajectory, and ball aerodynamics (i.e. dimple pattern), generally determine the distance a ball will travel when hit. Since clubhead speed and the angle of trajectory are not factors easily controllable, particularly by golf ball manufacturers, and the ball size and weight parameters are set by the United States Golf Association, the factors of concern among manufacturers are the coefficient of restitution (C.O.R.) and the surface configuration of the ball.

The golf ball's coefficient of restitution (C.O.R.) is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings. Although both the core and the cover contribute to the coefficient of restitution, the present invention is directed solely to the coefficient of restitution which is affected by the cover composition.

The coefficient of restitution of a golf ball is generally measured by propelling a ball at a given speed against a hard surface and measuring the ball's incoming and outgoing velocity electronically. As mentioned above, the coefficient of restitution is the ratio of the outgoing velocity to incoming velocity. The coefficient of restitution must be carefully controlled in all commercial golf balls in order for the ball to be within the specifications regulated by the United States Golf Association (U.S.G.A.). Along this line, the U.S.G.A. standards indicate that a "regulation" ball cannot have an initial velocity (i.e. the speed off the club) exceeding 255 feet per second. Since the coefficient of restitution of a ball is related to the ball's initial velocity, it is highly desirable to produce a ball having a sufficiently high coefficient of restitution to closely approach the U.S.G.A. limit on initial velocity, while having an ample degree of hardness (i.e. softness) to produce enhanced playability (i.e. spin, etc.).

The hardness of the ball is the second principal property involved in the performance of a golf ball. The hardness of the ball can affect the playability of the ball on striking and the sound or "click" produced. Hardness is determined as the deformation (i. e. compression) of the ball under various load conditions applied across the ball's diameter (i.e. the higher the compression value, the softer the material) and/or by Shore hardness characteristics (i.e. the lower the Shore hardness value, the softer the material). As indicated in U.S. Pat. No. 4,674,751, "softer" covers permit the accomplished golfer to impart proper spin. This is because the softer covers deform on impact significantly more than balls having "harder" ionomeric resin covers. As a result, this allows the better player to impart fade, draw, or backspin to the ball thereby enhancing playability.

Accordingly, the present invention is directed to new ionomer resin formulations containing high levels of metal stearates. It has been found that ionomer resin formulations containing high levels of metal stearates (i.e. about 10-100 parts by weight per 100 parts by weight of the ionomer (pph)) produce, upon molding around solid or wound cores to formulate a cover composition, golf balls exhibiting similar or enhanced distance (i.e. resilience) and playability (i.e. hardness/softness) properties without affecting the ball's durability (i.e. impact resistance, etc.) characteristics.

Along this line, metal stearates are generally useful in a wide variety of industries. They are useful wherever water repellency, internal or external lubrication, anti-agglomeration of particulate solids or viscosity modification (including gelation) is desired. Other inherent performance qualities that make stearates important to industry are their ability to impart flattening to varnishes, lacquers and solvent-based paints; improved suspension of solids in such paints; adhesion and slip to cosmetic powders; and dry lubrication to surfaces and particles. As a result, applications of metal stearates are found in toiletries and pharmaceuticals, cement and concrete, food, greases, inks, metal working and powder metallurgy, paper coating, plastics and rubber, petroleum production and wax products.

In the polymer industry, metal stearates are widely used as a lubricant. The most important of these is calcium stearate, used predominantly in PVC but also in polyolefins, ABS, polyesters, and phenolics. Calcium stearate acts as an internal lubricant in PVC, to promote fusion and modify melt viscosity during extrusion processing. It also acts as a co-stabilizer in many PVC applications when combined with a number of primary heat stabilizers. Other metal stearates, e.g., lead, barium, cadmium, zinc, and magnesium stearate are multifunctional in that they provide both heat stability and balanced lubricity to many PVC formulations when used in combination with other lubricant types. Small amounts of these metal stearates are also used to aid in the processing of polyolefins, ABS, nylon, polyester, and polystyrene. Their use here is generally to aid in metal release, rather than to act as internal lubricants.

While metal stearates are typically used as inert processing additives in rubber and plastic formulations, they are generally used in relatively low amounts (i.e. 0.01 to about 5 pph) as lubricants and/or dispersants to facilitate flow and/or to act as metal and/or mold releasing agents and as inorganic fillers. This is particularly true in the industry of golf ball production, wherein low amounts of metal stearates, such as about 0.01 to about 1.0 pph zinc stearate, have been utilized since at least the middle 1960's to facilitate the flow of ionomer resins in the molding process.

However, the present invention is directed to the discovery that the metal stearates, when added at relatively high levels to ionomer resin formulations, act as an ionic plasticizer". This occurs only when metal stearates in amounts greater than about 10 pph resin, generally from about 10 to about 100 pph resin, more preferably about 25 to about 75 pph resin, and most preferably, about 50 pph resin, are utilized in combination with the known ionomer resin formulations.

Since nearly all fillers produce drastic reductions in C.O.R. values when utilized in relatively high amounts in ionomer resin compositions, it was very surprising that the ionomer formulations of the present invention having high levels of metal stearates did not demonstrate these same negative results.

In addition, the low specific gravity of the various metal stearates such as zinc stearate, also allows for high loadings of filler without producing an illegally heavy golf ball as in the case of the HiSil ® fumed silica produced by PPG, Pittsburgh, Pa., which is generally regarded as the best white reinforcing filler in many rubber and plastics applications including the field of golf ball construction.

Consequently, the present invention is directed to the use of relatively high levels (greater than 10 pph resin) of metal stearates in ionomer resin compositions for the purpose of reducing cost and, in some circumstances, enhancing the C.O.R. and/or hardness (i. e. softness) values of the resulting cover compositions without affecting the cover's desired durability (impact resistance, etc.) properties. As a result of the improved C.O.R. values produced by the new ionomer resin formulations of the invention the balls exhibit enhanced travel distance. In addition, the new cover compositions produce, upon molding around solid or wound cores, golf balls exhibiting a sufficient amount of hardness (i.e. softness) to improve the playability characteristics of the balls.

These and other objects and features of the invention will be apparent from the following description and from the claims.

SUMMARY OF THE INVENTION

In one aspect, the present invention relates to a golf ball comprising a core and a cover wherein the cover comprises 100 parts by weight of one or more ionomer resins and generally from about 10 to about 100 parts by weight, and more preferably from about 25 to 75 parts by weight, of a metal stearate. In addition, the cover may consist of one or more additional ingredients such as pigments, dyes, U.V. absorbers and optical brighteners.

In another aspect, the invention is directed to a golf ball cover composition comprised of at least one ionomer resin, wherein the improvement comprises the addition of generally from about 10 to about 100 parts by weight resin, and more preferably from about 25 to about 75 parts by weight resin, of a metal stearate. Suitable metal stearates include, but are not limited to, zinc stearate, barium stearate, calcium stearate, and magnesium stearate. When the ionomer resin-metal stearate blend is utilized to manufacture the cover of a golf ball, the ball produced thereby exhibits properties of similar or improved distance without sacrificing and in some instances improving other desired characteristics such as playability and/or durability.

DETAILED DESCRIPTION OF THE INVENTION

The present invention relates to improved cover compositions for golf ball construction. In this regard, it has been found that if high levels (i.e. greater than 10 pph resin) of metal stearates are added to various ionomer resin formulations utilized in golf ball cover construction, the covers produced thereby exhibit similar or improved coefficient of restitution (C.O.R.) values combined with similar or reduced hardness (i.e. an increase in softness) properties.

Moreover, since the metal stearates are significantly cheaper (about $0.50–1.00/lb.) than the ionomer resins and the discovery that the metal stearates can be added at relatively high levels without detracting, and in many instances enhancing the physical properties of the overall formulations, the addition of high levels of the metal stearates presents significant cost savings in the production of golf balls.

In addition, a further advantage produced by the addition of the metal stearates to ionomer resin formulations is an increase in the melt flow index of the formulation, thereby facilitating molding.

While not wishing to be bound by any theory or mode of operation, the above indicated advantages are believed to be produced because the metal stearates (such as zinc stearate) act, when added at the high levels indicated, as an "ionic plasticizer" wherein only the ionic domains, and not the hydrocarbon portion of the ionomer is plasticized. Moreover, it is thought that above its crystalline melting point, the metal stearates solvate the ionic groups, thereby allowing for flow to occur more easily. Further, when cooled, the metal stearate plasticizer is crystalline and acts as a filler having strong interactions with the metal carboxylate groups, giving enhanced mechanical properties.

Consequently, the present invention is directed to the discovery that the metal stearates act as "ionic plasticizers" when utilized in ionomer resin compositions in amounts greater than about 10 pph resin, generally from about 10 to about 100 pph resin, more preferably about 25 to about 75 pph resin, and most preferably, about 50 pph resin. While various metal stearates are effective at high levels in the ionomer golf ball cover formulation of the present invention, zinc stearate ($Zn(C_{18}H_{35}O_2)_2$), due to its low cost, is the preferred metal stearate. However, as evidenced below in the Examples, other metal stearates such as barium stearate ($Ba(C_{18}H_{35}O_2)_2$), calcium stearate ($Ca(C_{18}H_{35}O_2)_2$), magnesium stearate ($Mg(C_{18}H_{35}O_2)_2$), etc. are also particularly effective.

Technical and multi-purpose grades of the metal stearates which have been found suitable for use in the present invention include those which are commercially available from various manufacturers such as from Witco Corporation, organics Div., New York, N.Y. and Mathe Company, Division of the Norac Co., Inc., Lodi, N.J. The commercially available metal (or metallic) stearates vary to some degree due to the percentages of total ash, free fatty acid, water-soluble salts, moisture, etc. For example, the typical properties of the metal (metallic) stearates which may be utilized in the present invention and offered by Mathe Co., are set forth below in Table 1.

TABLE 1

| Metallic Stearates | TYPICAL PROPERTIES | | | |
|---|---|---|---|---|
| | Percent Ash | % Free Fatty Acid | % Soluble Salts | % Moisture |
| ALUMINUM | | | | |
| Aluminum Octoate | 15.7 | 3.0 | 0.5 | 0.5 |
| Aluminum No. 6T | 6.0 | 30.0 | 0.5 | 0.5 |
| Aluminum No. 6 | 7.0 | 14.0 | 0.5 | 0.5 |
| Aluminum No. 8 | 8.5 | 7.5 | 0.5 | 0.5 |
| Aluminum No. 9 | 9.5 | 4.5 | 0.5 | 0.5 |
| Aluminum No. 14 USP | 15.0 | 1.0 | 0.5 | 0.5 |
| BARIUM | | | | |
| Barium Stearate | 29.0 | 0.5 | 0.2 | 1.0 |
| CALCIUM | | | | |
| Calcium Stearate | 9.4 | 1.5 | Nil | 2.0 |
| COAD ® 10 | 10.3 | 0.2 | Nil | 2.0 |
| COAD ® 10 NF | 10.3 | 0.2 | Nil | 2.0 |
| Calcium Stearate Disperso | 10.3 | 0.2 | 0.1 | 2.0 |
| LITHIUM | | | | |
| Lithium Stearate | 2.5 | 0.3 | Nil | 0.5 |
| MAGNESIUM | | | | |
| Magnesium Stearate | 7.8 | 1.2 | 0.3 | 3.0 |
| Magnesium Stearate NF | 7.8 | 1.2 | 0.3 | 3.0 |
| SODIUM | | | | |
| Sodium Stearate | 17.3 | 0.5 | Nil | 1.5 |
| ZINC | | | | |
| Zinc Stearate S | 14.5 | 0.1 | Nil | 0.5 |
| Zinc Stearate 25 S | 13.7 | 0.3 | Nil | 0.5 |
| COAD ® | 15.3 | 0.2 | Nil | 0.5 |
| COAD ® 21 (Clear Melt) | 13.7 | 0.3 | Nil | 0.5 |
| COAD ® 23 (Polymer) | 13.7 | 0.3 | Nil | 0.5 |
| COAD ® 26 USP | 13.7 | 0.3 | Nil | 0.5 |
| COAD ® 27 B | 14.1 | 0.1 | Nil | 0.5 |
| COAD ® 27 D | 14.1 | 0.1 | Nil | 0.5 |
| COAD ® 27 | 14.1 | 0.1 | Nil | 0.5 |
| Zinc Stearate 25 S Disperso | 13.7 | 0.3 | 0.1 | 0.5 |
| SPECIALTY | | | | |
| COAD ® (Ca/Zn Stearate) | 11.5 | 0.5 | Nil | 2.0 |

| Metallic Stearates | Softening Point | Specific Gravity | Mean Particle Size (Microns) | Density lb/CF |
|---|---|---|---|---|
| ALUMINUM | | | | |
| Aluminum Octoate | 275° CD | 1.03 | 25 | 16 |
| Aluminum No. 6T | 107° C. | 1.01 | 22 | 34 |
| Aluminum No. 6 | 127° C. | 1.01 | 22 | 18 |
| Aluminum No. 8 | 145° C. | 1.02 | 22 | 17 |
| Aluminum No. 9 | 158° C. | 1.01 | 22 | 19 |
| Aluminum No. 14 USP | 240° CD | 1.04 | 22 | 18 |
| BARIUM | | | | |
| Barium Stearate | 240° CD | 1.23 | 6 | 19 |

TABLE 1-continued

| CALCIUM | | | | |
|---|---|---|---|---|
| Calcium Stearate | 155° C. | 1.03 | 7 | 16 |
| COAD ® 10 | 155° C. | 1.03 | 12 | 28 |
| COAD ® 10 NF | 155° C. | 1.03 | 12 | 28 |
| Calcium Stearate Disperso | 155° C. | 1.03 | 12 | 28 |
| LITHIUM | | | | |
| Lithium Stearate | 212° C. | 1.01 | 7 | 10 |
| MAGNESIUM | | | | |
| Magnesium Stearate | 144° C. | 1.03 | 8 | 18 |
| Magnesium Stearate NF | 144° C. | 1.03 | 8 | 18 |
| SODIUM | | | | |
| Sodium Stearate | 205° C. | 1.07 | 25 | 28 |
| ZINC | | | | |
| Zinc Stearate S | 125° C. | 1.09 | 7 | 10 |
| Zinc Stearate 25 S | 122° C. | 1.09 | 8 | 27 |
| COAD ® | 122° C. | 1.09 | 12 | 25 |
| COAD ® 21 (Clear Melt) | 122° C. | 1.09 | 12 | 30 |
| COAD ® 23 (Polymer) | 122° C. | 1.09 | 12 | 30 |
| COAD ® 26 USP | 122° C. | 1.09 | 12 | 30 |
| COAD ® 27 B | 123° C. | 1.09 | 7 | 20 |
| COAD ® 27 D | 123° C. | 1.09 | 12 | 31 |
| COAD ® 27 | 123° C. | 1.09 | 25 | 33 |
| Zinc Stearate 25 S Disperso | 122° C. | 1.09 | 8 | 27 |
| SPECIALTY | | | | |
| COAD ® (Ca/Zn Stearate) | 97° C. | 1.06 | 17 | 33 |

D - Decomposes
All Mathe ® Stearates are manufactured with chick edema free fatty acid.

Other metal stearates, such as those manufactured by Witco Corporation, Organic Div., New York, N.Y., having similar typical properties as those listed above are also commercially available and suitable for use in the present invention.

The ionomer resins utilized to produce the cover compositions are ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. In some circumstances, an additional comonomer such as an acrylic ester (i.e., methyl acrylate, iso- or α-butylacrylate, etc.) can also be included to produce a softer terpolymer. The carboxylic acid groups of the copolymer are partially (i.e. approximately 15-75 percent) neutralized by the metal ions.

Preferably, the ionomeric resins are copolymers of ethylene and either acrylic and/or methacrylic acid. In addition, two or more types of ionomeric resins may be blended into the cover compositions in order to produce the desired properties of the resulting golf balls.

Although the scope of the patent embraces all known ionomeric resins falling within the parameters set forth above, only a relatively limited number of these ionomeric resins are commercially available. In this regard, the ionomeric resins sold by E.I. DuPont de Nemours Company under the trademark "Surlyn ®", and the ionomer resins sold by Exxon Corporation under either the trademarks "Escor ®" or the tradename "Iotek" are examples of commercially available ionomeric resins which may be utilized in the present invention in the particular combinations described in detail below.

The ionomeric resins introduced under the designation "Escor ®" and now sold under the new designation "Iotek", are somewhat similar to the ionomeric resins sold under the "Surlyn ®" trademark. However, since the "Iotek" ionomeric resins are sodium or zinc salts of poly(ethylene acrylic acid) and the "Surlyn ®" resins are zinc or sodium salts of poly(ethylene methacrylic acid) some distinct differences in properties exist.

Furthermore, while the ionomer resins may be classified dependent upon different physical and chemical characteristics (i. e. hard (high modulus), soft (low modulus), high-acid, low-acid, etc.) it has been found that essentially all of the different types of ionomer resins are functional with high levels of the metal stearates.

This includes, but is not limited to, soft ionomers (such as the Surlyn ® 8269 and 8265 methacrylic acid based soft ionomers set forth in U.S. Pat. No. 4,884,814 which may be generally defined as having a modulus of from about 2,000 to about 10,000 P.S.I. as measured in accordance with A.S.T.M. method D-790 and a hardness of from about 20 to about 40 as measured on the Shore D scale and, the recently discovered ethylene acrylic acid based soft ionomers, Iotek 7520 and 7510 defined generally in U.S. Ser. No. 07/559,177), and hard ionomers (such as Surlyn ® 8940 and 9910 set forth in U.S. Pat. No. 4,884,814 having a flexural modulus of from about 30,000 to about 55,000 P.S.I. and a hardness of from about greater than 40, more particularly from about 60 to about 66 on the Shore D scale, as well as Iotek 4000 and 8000/900 and those disclosed in U.S. Pat. No. 4,911,451). In addition, hard-soft ionomer resin blends thereof (see U.S. Pat. No. 4,884,814), as well as ionomer blends comprised of the recently developed high acid ionomers (i.e. ionomer resins containing greater than 16 weight percent acid such as Surlyn ® AD-8422, Surlyn ® 8162 and Iotek 959 and Iotek 960) may be utilized.

More specifically, the inventors have found that the new ethylene-acrylic acid based soft ionomer resins recently developed by Exxon under the designations "Iotek 7520" and Iotek 7510" (a more highly neutralized version of Iotek 7520) produce enhanced results when utilized in combination with high amounts of metal stearates. The physical properties of Iotek 7520 are as follows:

TABLE 2

| Property | ASTM Method | Units | Typical Value |
|---|---|---|---|
| Physical Properties of Iotek 7520 | | | |
| Melt Index | D-1238 | G/10 min. | 2 |
| Density | D-1505 | kg/m$^3$ | 0.962 |
| Cation | | | Zinc |
| Melting Point | D-3417 | °C. | 66 |
| Crystallization Point | D-3417 | °C. | 49 |
| Vicat Softening Point | D-1525 | °C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebond | ISO 4862 | % | 52 |
| De Mattia Flex Resistance | D-430 | Cycles | >5000 |

Test data collected by the inventors indicates that Iotek 7520 resins have Shore D hardnesses of about 32-36 (per ASTM D-2240), melt flow indexes of 3±0.5 g/10 min (at 190° C. per ASTM D-1288), a flexural moduli of about 2500-3500 psi (per ASTM D-790). Furthermore, testing by an independent testing laboratory by pyrolysis mass spectrometry indicates that the Iotek 7520 resins are generally zinc salts of a terpolymer of ethylene, acrylic acid, and methyl acrylate.

In addition, the methacrylic acid based soft ionomers sold by DuPont under the designation Surlyn ® 8265 and Surlyn ® 8269 may also be used. These are low acid (containing 15% or less acid) sodium ion based ionomers having Shore D hardnesses and 39 and 25 respectively.

Examples of commercially available hard ionomeric resins which may be utilized in the present invention include the hard sodium ionic copolymer sold under the trademark "Surlyn ® 8940" and the hard zinc ionic copolymer sold under the trademark "Surlyn ® 9910". Surlyn ® 8940 is a copolymer of ethylene with methacrylic acid with about 15 weight percent acid which is about 294 neutralized with sodium ions. This resin has an average melt flow index of about 2.8. Surlyn ® 9910 is a copolymer of ethylene and methacrylic acid with about 15 weight percent acid which is about 584 neutralized with zinc ions. The average melt flow index of Surlyn ® 9910 is about 0.7. The typical properties of Surlyn ® 9910 and 8940 are set forth below in Table 3.

TABLE 3

Typical Properties of Commercially Available Hard Surlyn ® Resins

| | ASTM D | 8940 | 9910 | 8920 | 8528 | 9970 | 9730 |
|---|---|---|---|---|---|---|---|
| Cation Type | | Sodium | Zinc | Sodium | Sodium | Zinc | Zinc |
| Melt flow | D-1238 | 2.8 | 0.7 | 0.9 | 1.3 | 14.0 | 1.6 |

TABLE 3-continued

Typical Properties of Commercially Available Hard Surlyn ® Resins

| | ASTM D | 8940 | 9910 | 8920 | 8528 | 9970 | 9730 |
|---|---|---|---|---|---|---|---|
| index, gms/10 min. | | | | | | | |
| Specific Gravity, g/cm³ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m₂ (ft.-lbs./in²) | D-18225 | 1020 (485) | 1020 (485) | 865 (410) | 1160 (550) | 760 (360) | 1240 (590) |
| Vicat Temperature, °C. | D-1525 | 63 | 62 | 58 | 73 | 61 | 73 |
| % Weight Methacrylic Acid (MAA) | | 15 | 15 | 15 | 10 | 15 | 12 |
| % of Acid Groups Cation Neutralized | | 29 | 58 | 59 | 54 | 22 | 38 |

In addition, examples of the acrylic acid based hard ionomer resins suitable for use in the present invention sold under the "Iotek" tradename by the Exxon Corporation include "Iotek 4000" (formerly "Escor ® 4000"), "Iotek 4010", "Iotek 7010", Iotek 7020", "Iotek 7030", "Iotek 8000" (formerly Escor ® 900), "Iotek 8020", and "Iotek 8030". The typical properties of the Iotek hard ionomers are set forth below in Table 4.

TABLE 4

Typical Properties of Iotek Hard Ionomers

| Resin Properties | ASTM Method | Units | 4000 | 4010 | 8000 | 8020 | 8030 |
|---|---|---|---|---|---|---|---|
| Cation type | | | zinc | zinc | sodium | sodium | sodium |
| Melt index | D-1238 | g/10 min. | 2.5 | 1.5 | 0.8 | 1.6 | 2.8 |
| Density | D-1505 | kg/m³ | 963 | 963 | 954 | 960 | 960 |
| Melting Point | D-3417 | °C. | 90 | 90 | 90 | 87.5 | 87.5 |
| Crystallization Point | D-3417 | °C. | 62 | 64 | 56 | 53 | 55 |
| Vicat Softening Point | D-1525 | °C. | 62 | 63 | 61 | 64 | 67 |
| % Weight Acrylic Acid | | | | 16 | | 11 | |
| % of Acid Groups cation neutralized | | | | 30 | | 40 | |

| Plaque Properties (3 mm thick, compression molded) | ASTM Method | Units | 4000 | 4010 | 8000 | 8020 | 8030 |
|---|---|---|---|---|---|---|---|
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore Hardness D | D-2240 | — | 55 | 55 | 61 | 58 | 59 |

| Resin Properties | ASTM Method | Units | 7010 | 7020 | 7030 |
|---|---|---|---|---|---|
| Cation type | | | Zinc | Zinc | Zinc |
| Melt index | D-1238 | g/10 min. | 0.8 | 1.5 | 2.5 |
| Density | D-1505 | kg/m³ | 960 | 960 | 960 |
| Melting Point | D-3417 | °C. | 90 | 90 | 90 |
| Crystallization Point | D-3417 | °C. | — | — | — |
| Vicat Softening Point | D-1525 | °C. | 60 | 63 | 62.5 |

| Plaque Properties (3 mm thick, compression molded) | ASTM Method | Units | 7010 | 7020 | 7030 |
|---|---|---|---|---|---|
| Tensile at break | D-638 | MPa | 38 | 38 | 38 |
| Yield point | D-638 | MPa | None | None | None |
| Elongation at break | D-638 | % | 500 | 420 | 395 |

TABLE 4-continued

| | | | | | |
|---|---|---|---|---|---|
| 1% Secant modulus | D-638 | MPa | — | — | — |
| Shore Hardness D | D-2240 | — | 57 | 55 | 55 |

Examples of the high acid methacrylic acid based ionomers found suitable for use in accordance with this invention include Surlyn ® AD-8422 (sodium cation), Surlyn ® 8162 (zinc cation), Surlyn ® SEP-503-1 (zinc cation), and Surlyn ® SEP-503-2 (magnesium cation). According to DuPont, all of these ionomers contain from about 18.5 to about 21.5% by weight methacrylic acid.

More particularly, Surlyn ® AD-8422, is currently commercially available from DuPont in a number of different grades (i.e. AD-8422-2, AD-8422-3, AD-8422-5, etc.) based upon differences in melt index. According to DuPont, Surlyn ® AD-8422 offers the following general properties when compared to Surlyn ® 8920 the stiffest, hardest of all of the low acid grades (referred to as "hard" ionomers in U.S. Pat. No. 4,884,814):

TABLE 5

| | LOW ACID (15 wt % Acid) | HIGH ACID (≈20 wt-% Acid) | |
|---|---|---|---|
| | SURLYN ® 8920 | SURLYN ® 8422-2 | SURLYN ® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP[1], °C. | 88 | 86 | 85 |
| FP[1], °C. | 47 | 48.5 | 45 |
| COMPRESSION MOLDING[2] | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn ® 8920 to Surlyn ® 8422-2 and Surlyn ® 8422-3, it is noted that the high acid Surlyn ® 8422-2 and 8422-3 ionomers have a higher tensile yield, lower elongation, slightly higher Shore D hardness and much higher flexural modulus. Surlyn ® 8920 contains 15 weight percent methacrylic acid and is 59% neutralized with sodium.

In addition, Surlyn ® SEP-503-1 (zinc cation) and Surlyn ® SEP-503-2 (magnesium cation) are high acid zinc and magnesium versions of the Surlyn ® AD 8422 high acid monomers. When compared to the Surlyn ® AD 8422 high acid ionomers, the Surlyn ® SEP-503-1 and SEP-503-2 ionomers can be defined as follows:

TABLE 6

| Surlyn ® | Ion | Melt Index | Neutralization % |
|---|---|---|---|
| AD 8422-3 | Na | 1.0 | 45 |
| SEP 503-1 | Zn | 0.8 | 38 |
| SEP 503-2 | Mg | 1.8 | 43 |

Furthermore, Surlyn ® 8162 is a zinc cation ionomer resin containing approximately 20% by weight (i.e. 18.5–21.5% weight) methacrylic acid copolymer that has been 30–70% neutralized. Surlyn ® 8162 is currently commercially available from DuPont.

Examples of the high acid acrylic acid based ionomers suitable for use in the present invention include the Escor ® or Iotek high acid ethylene acrylic acid ionomers recently produced by Exxon. In this regard, Escor ® or Iotek 959 is a sodium ion neutralized ethylene-acrylic acid copolymer and Escor ® or Iotek 960 is a zinc neutralized ethylene-acrylic acid copolymer. According to Exxon, Ioteks 959 and 960 contain from about 19.0 to about 21.0 by weight acrylic acid with approximately 30 to about 70 percent of the acid groups neutralized with sodium and zinc ions respectfully. The physical properties of these high acid acrylic acid based ionomers are as follows:

TABLE 7

| PROPERTY | ESCOR ® (IOTEK) 959 | ESCOR ® (IOTEK) 960 |
|---|---|---|
| Melt Index, g/10 min | 2.0 | 1.8 |
| Cation | Sodium | Zinc |
| Melting Point, °F. | 172 | 174 |
| Vicat Softening Point, °F. | 130 | 131 |
| Tensile @ Break, psi | 4600 | 3500 |
| Elongation @ Break, % | 325 | 430 |
| Hardness, Shore D | 66 | 57 |
| Flexural Modulus, psi | 66,000 | 27,000 |

As mentioned above and more clearly indicated below in the Examples, it has been found that use of high levels of metal stearates produce, when combined with ionomer resin formulations, golf balls exhibiting similar or enhanced properties, including longer distance with similar or softer hardness, over known ionomer blends. While the preferred ionomer resin formulations are blends of the low acid, hard Iotek 4000(7030)/900(8000) resins due to higher C.O.R. values and lower costs in comparison with the Surlyn ® ionomer blends, the remaining reviewed ionomers and/or ionomer blends also appear to be functional with high levels of metal stearates.

According to the present invention, it has been found that improved, lower cost, golf balls can be produced from a central core and an outer cover wherein the outer cover is made from an ionomer resin composition comprised of about 10 to about 100 parts by weight per 100 parts by weight of the ionomer resin of a metal stearate. When the ionomer resin/metal stearate cover composition is processed according to the parameters set forth below to produce the cover of a multi-layered golf ball, the resulting golf ball will generally travel further and have better overall playability characteristics than known ionomer resin cover compositions.

More preferably, it has been found that a lower costing golf ball exhibiting similar or enhanced travel distance (i.e. higher C.O.R. values) with similar or improved playability (i.e. softness) characteristics without a sacrifice in durability, can be produced from a core and a cover, wherein the cover comprises from about 25% to about 75% (and most preferably about 50%) as based upon the weight of the ionomer base mixture of a metal stearate. This is particularly important in that an improvement of 0.001 C.O.R. generally relates to an improvement of about 0.2 to 0.5 yards in travel distance.

Further superior results may be achieved when the ionomer resin utilized is a blend of sodium or zinc salt of poly(ethylene acrylic acid) such as those sold by Exxon under the Iotek designation, particularly Iotek 4000 and Iotek 8000/900 and/or a sodium and zinc salt of poly-(ethylene methacrylic acid) such as those sold by DuPont under the Surlyn ® designation, particularly Surlyn ® 8940 and Surlyn ® 9910, and the metal stearate utilized is zinc stearate, barium stearate, magnesium stearate and/or calcium stearate.

Additional compatible additive materials may also be added to the compositions of the present invention, such as dyes (for example, Ultramarine Blue sold by Whitaker, Clark, and Daniels of South Painsfield, N.J.), and pigments, i.e. white pigments such as titanium dioxide (for example Unitane 0–110) zinc oxide, and zinc sulfate, as well as fluorescent pigments. As indicated in U.S. Pat. 4,884,814, the amount of pigment and/or dye used in conjunction with the polymeric cover composition depends on the particular base ionomer mixture utilized and the particular pigment and/or dye utilized. The concentration of the pigment in the polymeric cover composition can be from about 1% to about 10% as based on the weight of the base ionomer mixture. A more preferred range is from about 1% to about 5% as based on the weight of the base ionomer mixture. The most preferred range is from about 1% to about 3% as based on the weight of the base ionomer mixture. The most preferred pigment for use in accordance with this invention is titanium dioxide.

Moreover, since there are various hues of white, i.e. blue white, yellow white, etc., trace amounts of blue pigment may be added to the cover stock composition to impart a blue white appearance thereto. However, if different hues of the color white are desired, different pigments can be added to the cover composition at the amounts necessary to produce the color desired.

In addition, it is within the purview of this invention to add to the cover compositions of this invention compatible materials which do not affect the basic novel characteristics of the composition of this invention. Among such materials are antioxidants (i.e. Santonox R), antistatic agents, stabilizers and processing aids. The cover compositions of the present invention may also contain additional softening agents, such as plasticizers, etc., and reinforcing materials such as glass fibers and additional inorganic fillers, as long as the desired properties produced by the golf ball covers of the invention are not impaired.

Furthermore, optical brighteners, such as those disclosed in U.S. Pat. No. 4,679,795, may also be included in the cover composition of the invention. Examples of suitable optical brighteners which can be used in accordance with this invention are Uvitex OB as sold by the Ciba-Geigy Chemical Company, Ardsley, N.Y. Uvitex OB is thought to be 2,5-Bis(5-tert-butyl-2-benzoxazoly)-thiopene. Examples of other optical brighteners suitable for use in accordance with this invention are as follows: Leucopure EGM as sold by Sandoz, East Hanover, N.J. 07936. Leucopure EGM is thought to be 7- (2n-naphthol (1, 2-d) -triazol-2yl)-3phenyl-coumarin. Phorwhite K-2OG2 is sold by Mobay Chemical Corporation, P.O. Box 385, Union Metro Park, Union, N.J. 07083, and is thought to be a pyrazoline derivative, Eastobrite OB-1 as sold by Eastman Chemical Products, Inc., Kingsport, Tenn., is thought to be 4,4-Bis(-benzoxaczoly)stilbene. The above-mentioned uvitex and Eastobrite OB-1 are preferred optical brighteners for use in accordance with this invention.

Moreover, since many optical brighteners are colored, the percentage of optical brighteners utilized must not be excessive in order to prevent the optical brightener from functioning as a pigment or dye in its own right.

The percentage of optical brighteners which can be used in accordance with this invention is from about 0.01% to about 0.5% as based on the weight of the ionomer resin used as a cover stock. A more preferred range is from about 0.05% to about 0.25% with the most preferred range from about 0.10% to about 0.20% depending on the optical properties of the particular optical brightener used and the polymeric environment in which it is a part.

Generally, the additives are admixed with an ionomer to be used in the cover composition to provide a masterbatch (M.B.) of desired concentration and an amount of the masterbatch sufficient to provide the desired amounts of additive is then admixed with the copolymer blends.

The cover compositions of the present invention may be produced according to conventional melt blending procedures. In this regard, the ionomeric resins and the metal stearates are blended along with the masterbatch containing the desired additives in a Banbury type mixer, two-roll mill, or extruded prior to molding. The blended composition is then formed into slabs or pellets, etc. and maintained in such a state until molding is desired. Alternatively a simple dry blend of the pelletized or granulated resins, the metal stearates and the color masterbatch may be prepared and fed directly into the injection molding machine where homogenization occurs in the mixing section of the barrel prior to injection into the mold. If necessary, further additives such as an additional inorganic filler, etc., may be added and uniformly mixed before initiation of the molding process.

Moreover, golf balls of the present invention can be produced by molding processes currently well known in the golf ball art. Specifically, the golf balls can be produced by injection molding or compression molding the novel cover compositions about wound or solid molded cores to produce a golf ball having a diameter of about 1.680 inches or greater and weighing about 1.620 ounces. The standards for both the diameter and weight of the balls are established by the United States Golf Association (U.S.G.A.). Although both solid core and wound cores can be utilized in the present invention, as a result of their lower cost and superior performance, solid molded cores are preferred over wound cores.

Conventional solid cores are typically compression molded from a slug of uncured or lightly cured elastomer composition comprising a high cis content polybutadiene and a metal salt of an $\alpha, \beta$ ethylenically unsaturated carboxylic acid such as zinc mono or diacrylate or methacrylate. To achieve higher coefficients of restitution in the core, the manufacturer may include a small amount of a metal oxide such as zinc oxide. In addition, larger amounts of metal oxide than those that are needed to achieve the desired coefficient may be included in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiator catalysts such as peroxides are admixed with the core composition so that on the application of heat and pressure, a complex curing or cross-linking reaction takes place.

The term "solid cores" as used herein refers not only to one piece cores but also to those cores having a separate solid layer beneath the cover and above the core as in U.S. Pat. No. 4,431,193, and other multilayer and/or non-wound cores (such as those described in U.S. Pat. No. 4,848,770).

Wound cores are generally produced by winding a very large elastic thread around a solid or liquid filled balloon center. The elastic thread is wound around the center to produce a finished core of about 1.4 to 1.6 inches in diameter, generally. Since the core material is not an integral part of the present invention, a detailed discussion concerning the specific types of core materials which may be utilized with the cover compositions of the invention are not specifically set forth herein. In this regard, the cover compositions of the invention may be used in conjunction with any standard golf ball core.

As indicated, the golf balls of the present invention may be produced by forming covers consisting of the compositions of the invention around cores by conventional molding processes. For example, in compression molding, the cover composition is formed via injection at about 380OF to about 450OF into smooth surfaced hemispherical shells which are then positioned around the core in a dimpled golf ball mold and subjected to compression molding at 200°-300° F. for 2-10 minutes, followed by cooling at 50°-70° F. for 2-10 minutes, to fuse the shells together to form an unitary ball. In addition, the golf balls may be produced by injection molding, wherein the cover composition is injected directly around the core placed in the center of a golf ball mold for a period of time at a mold temperature of from 50° F. to about 1000° F. After molding the golf balls produced may undergo various further finishing steps such as buffing, painting, and marking as disclosed in U.S. Pat. No. 4,911,451.

The present invention is further illustrated by the following examples in which the parts of the specific ingredients are by weight (pph) per 100 parts of ionomer resin. It is to be understood that the present invention is not limited to the examples, and various changes and modifications may be made in the invention without departing from the spirit and scope thereof.

EXAMPLES

By blending the ingredients set forth in the Tables below, a series of cover formulations were produced. Finished golf balls were prepared using the cover compositions of the present invention, controls and comparative cover compositions by positioning a solid preformed cross-linked polybutadiene core in an injection molding cavity in such a manner to permit the uniform injection of the selected cover composition over each core. Along this line, the cover formulations were injection molded at about 400° F. around identical solid type cores having a finished diameter of 1.545 inches to produce golf balls approximately 1.680 inches in diameter having a normal cover thickness of 0.0675 inches. All materials were molded under essentially identical conditions. The properties of Riehle compression, coefficient of restitution (C.O.R.), Shore hardness, cold crack, cut resistance, and wet barrel for the cover compositions were then determined.

In conducting the comparative prior art testing, Surlyn® 9910, Surlyn® 8940, Surlyn® 8265, Surlyn® 8269, Escor® (Iotek) 4000/7030 Escor® (Iotek) 7520 and Escor® (Iotek) 900/8000 ionomers were utilized, as well as various combinations of the above disclosed ionomeric resins. In this regard, blends of Surlyn® 9910 and Surlyn® 8940 (i.e. the subject of U.S. Pat. No. 4,884,814) and blends of Escor® 4000/7030 and Escor® 900/8000 (i.e. the subject of U.S. Pat. No. 4,911,451) are considered by the inventors to be generally among the best prior art cover compositions concerning ethylene-methacrylic acid and ethylene-acrylic acid ionomer blends, respectively.

In the examples set forth below Surlyn® White MB (master batch) is, unless indicated differently, comprised of 74.9% Surlyn® 8528, 23.7% Unitane 0-110, 0.24% Ultra Blue, 1.054 Uvitex O.B. and 0.03% Santonox R; and, Escor® (Iotek) White MB (masterbatch) is comprised of 74.9% Iotek 4000, 23.7% Unitane 0-110, 0.24% Ultra Blue, 1.05% Uvitex O.B., and 0.03% Santonox R. In addition, unless indicated differently, the zinc stearate utilized in the example is Technical Grade granular, manufactured and sold by Mallincrodt, Inc.; the aluminum stearate is Aluminum No. 14 USP, manufactured and sold by The Mathe Co.; the barium stearate is manufactured and sold by The Mathe Co.; the calcium stearate is Coad 10, manufactured and sold by The Mathe Co.; the lithium stearate is manufactured and sold by The Mathe Co.; the magnesium stearate is manufactured and sold by The Mathe Co.; and the sodium stearate is manufactured and sold by The Mathe Co.

The data for each example represents the average data for one dozen balls produced according to the desired manner. The properties were measured according to the following parameters:

Riehle compression is a measurement of the deformation of a golf ball in thousandths of an inch under a fixed static load of 225 pounds (i.e. a Riehle compression of 47 corresponds to a deflection under load of 0.047 inches).

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

Shore hardness was measured in accordance with ASTM Test D-2240.

Cold cracking resistance was measured by firing balls from an air cannon, 5 blows at 165 feet/sec, after the balls had been conditioned for 24 hours at −100° F. After allowing the balls to equilibrate to room temperature the balls are inspected for cover cracking.

The barrel test or barrel durability test involves firing golf balls at 135 ft./sec. (at 720° F.), into a 5-sided container, the walls of which are steel plates that have grooves milled into them to simulate a golf club face. The balls are subjected to 100 to 300 blows and are inspected at regular intervals for breakage (i.e. any signs of cover cracking or delamination).

TABLE 8

| | FORMULATIONS | | | | | | | |
|---|---|---|---|---|---|---|---|---|
| | 1 | 2 | 3 | 4 | 5 | 6 | 7 | 8 |
| INGREDIENTS | | | | | | | | |

TABLE 8-continued

| | FORMULATIONS | | | | | | | |
|---|---|---|---|---|---|---|---|---|
| | 1 | 2 | 3 | 4 | 5 | 6 | 7 | 8 |
| Surlyn ® 9910 | 22.0 | 22.0 | 22.0 | 22.0 | — | — | — | — |
| Surlyn ® 8940 | 7.0 | 7.0 | 7.0 | 7.0 | — | — | — | — |
| Surlyn ® 8265 | 21.0 | 21.0 | 21.0 | 21.0 | — | — | — | — |
| Surlyn ® 8269 | 50.0 | 50.0 | 50.0 | 50.0 | — | — | — | — |
| Iotek 8000 | — | — | — | — | 27.5 | 27.5 | 27.5 | 27.5 |
| Iotek 7030 | — | — | — | — | 27.5 | 27.5 | 27.5 | 27.5 |
| Iotek 7520 | — | — | — | — | 45.0 | 45.0 | 45.0 | 45.0 |
| Zinc Stearate | — | 10 | 50 | 100 | — | 10 | 50 | 100 |
| PROPERTIES | | | | | | | | |
| Weight, grams | 45.8 | 45.9 | 46.0 | 46.0 | 45.8 | 46.0 | 45.9 | 45.9 |
| Riehle Compression | 51 | 51 | 50 | 47 | 48 | 50 | 48 | 46 |
| C.O.R. | .779 | .781 | .785 | .785 | .782 | .783 | .783 | .780 |
| Barrel Durability | NB | NB | NB | NB | NB | NB | NB | NB |

TABLE 9

| | FORMULATIONS | | | | |
|---|---|---|---|---|---|
| | 9 | 10 | 11 | 12 | 13 |
| INGREDIENTS | | | | | |
| Iotek 4000/7030 | 750 | 600 | 525 | 450 | 375 |
| Iotek 900/8000 | 750 | 600 | 525 | 450 | 375 |
| Zinc Stearate | — | 300 | 450 | 600 | 750 |
| PROPERTIES | | | | | |
| Riehle Compression | 46 | 47 | 47 | 50 | 51 |
| C.O.R. | .811 | .811 | .811 | .810 | .809 |
| Cold Crack | NB | NB | NB | NB | NB |

TABLE 10

| | FORMULATIONS | | | | |
|---|---|---|---|---|---|
| | 14 | 15 | 16 | 17 | 18 |
| INGREDIENTS | | | | | |
| Iotek 4000/7030 | 50 | 50 | 50 | 50 | 50 |
| Iotek 900/8000 | 50 | 50 | 50 | 50 | 50 |
| ED-Flake (flake form of zinc stearate) | — | 25 | 50 | — | — |
| Zinc Tallate (tallow based) | — | — | — | 25 | 50 |
| PROPERTIES | | | | | |
| Riehle Compression | 49 | 49 | 48 | 53 | 50 |
| C.O.R. | .811 | .813 | .815 | .803 | .801 |

TABLE 11

| | FORMULATIONS | | | | | | | | |
|---|---|---|---|---|---|---|---|---|---|
| | 19 | 20 | 21 | 22 | 23 | 24 | 25 | 26 | 27 |
| INGREDIENTS | | | | | | | | | |
| Iotek 4000 | 750 | 750 | 750 | 750 | 750 | 750 | 750 | 750 | 750 |
| Iotek 900 | 750 | 750 | 750 | 750 | 750 | 750 | 750 | 750 | 750 |
| Zinc Stearate | — | 300 | — | 450 | — | 600 | — | 750 | — |
| HiSil ® 233 | — | — | 300 | — | 450 | — | 600 | — | 750 |
| PROPERTIES | | | | | | | | | |
| Weight, grams | 45.2 | 45.4 | 46.1 | 45.5 | — | 45.6 | — | 45.6 | — |
| Riehle Compression | 49 | 51 | 47 | 51 | — | 51 | — | 51 | — |
| C.O.R. | .808 | .817 | .813 | .817 | — | .817 | — | .817 | — |
| Barrel Test (300 Blows) | NB | NB | NB | 2 | — | 1 | — | NB | — |
| Repeated Barrel Test | NB | NB | — | NB | — | NB | — | NB | — |

TABLE 12

| INGREDIENTS | Top-Flite ® XL CONTROL | FORMULATIONS | | | | | | |
|---|---|---|---|---|---|---|---|---|
| | | 28 | 29 | 30 | 31 | 32 | 33 | 34 |
| Iotek 4000 | — | 600 | 600 | 600 | 600 | 600 | 600 | 600 |
| Iotek 900 | — | 600 | 600 | 600 | 600 | 600 | 600 | 600 |
| Zinc Stearate | — | 600 | — | — | — | — | — | — |
| Aluminum Stearate | — | — | 600 | — | — | — | — | — |
| Barium Stearate | — | — | — | 600 | — | — | — | — |
| Calcium Stearate | — | — | — | — | 600 | — | — | — |
| Lithium Stearate | — | — | — | — | — | 600 | — | — |
| Magnesium Stearate | — | — | — | — | — | — | 600 | — |
| Sodium Stearate | — | — | — | — | — | — | — | 600 |
| C.O.R. | .812 | .821 | — | .821 | .823 | .726 | .819 | .721 |

TABLE 13

| | FORMULATIONS | | | | | | | |
|---|---|---|---|---|---|---|---|---|
| | 35 | 36 | 37 | 38 | 39 | 40 | 41 | 41 |
| INGREDIENTS | | | | | | | | |
| Iotek 959 | 50 | 50 | 50 | 50 | — | — | — | — |
| Iotek 960 | 50 | 50 | 50 | 50 | — | — | — | — |
| Surlyn ® 8162 | — | — | — | — | 75 | 75 | 75 | 75 |
| Surlyn ® 8422 | — | — | — | — | 25 | 25 | 25 | 25 |
| Zinc Stearate | — | 10 | 50 | 75 | — | 10 | 50 | 75 |
| PROPERTIES | | | | | | | | |
| Weight, grams | 45.9 | 45.9 | 46.0 | 45.8 | 45.9 | 45.7 | 45.7 | 45.8 |
| Riehle Compression | 49 | 47 | 46 | 49 | 50 | 51 | 50 | 50 |
| C.O.R. | .816 | .816 | .816 | .815 | .814 | .806 | .807 | .806 |
| Barrel Durability | NB | NB | NB | NB | NB | NB | NB | NB |

DISCUSSION OF THE EXAMPLES

The data set forth in Table 8 directed to covers composed of various hard-soft ionomer blends indicates that the addition of high levels of metal stearates produces golf balls exhibiting similar or higher C.O.R. values (and thus better distance) while maintaining, and in some instances improving, the softness and playability characteristics of the balls. In addition the overall weight of the balls remains approximately the same. These characteristics can be seen in Formulations 1–4 directed to the addition of various amounts of zinc stearate to the hard-soft methacrylic acid based ionomer resin blends which are the subject matter of U.S. Pat. No. 4,884,814, and are essentially equivalent to Spalding's Tour Edition ® 100 ball. Similar results are also demonstrated in Formulations 5–8 which relate to the hard-soft acrylic acid based ionomer resin blends which are the subject matter of U.S. patent application Ser. No. 07/559,177 and are representative of Spalding's Tour Editions 90 ball.

The data indicated in Tables 9 and 13 demonstrates that large amounts of metal stearates can be substituted for the ionomer resins for the purposes of producing lower costing cover compositions. In this regard, the Formulations set forth in Table 9 are directed to various hard acrylic acid based ionomer blends. When fairly large amounts of zinc stearate are added, the softness or playability properties of the balls increases with little reduction in the C.O.R. and durability characteristics. Similar results can be seen with the high acid blends shown in Table 13.

Similarly, the data set forth in Table 10 shows that zinc stearate, when added in flake form (i.e. ED-Flake, Witco corporation, New York, N.Y.), to blends of Iotek 4000/7030 and Iotek 900/8000 (i.e. the subject of U.S. Pat. No. 4,911,451), produces enhanced results (i.e. an increase in C.O.R. values while substantially maintaining hardness properties) in comparison with zinc tallate (tallow base), a product of the Rockland React-Rite Corp., Rockmart, Ga.

In Table 11, various levels of zinc stearate were evaluated in comparison with HiSil ®, a fumed silica produced by PPG, Pittsburgh, Pa. As indicated above, HiSil ® is generally regarded as the best white reinforcing filler in the field of golf ball production. The data clearly indicates that the ionomer resin formulations containing the HiSil ® filler suffer from substantial reductions in C.O.R. and compression (i.e. are harder), as well as increases in weight in comparison with samples containing equal levels of zinc stearate. In addition, as indicated in Formulation 23, 25 and 27, formulations containing greater than 20 pph silica filler were infusible because the mixes became dry and powder-like, unlike the zinc stearate formulation where the mixes remained fluid (molten).

Furthermore, Table 12 shows the effectiveness of various metal stearates at 50 pph loading level. The data clearly indicates that the barium, calcium, magnesium and zinc stearates produce similar positive results in comparison to the control (i.e. the Top Flite ® XL ball). In addition, this data indicates that the transitional metal (Zn) and the alkaline earth (Ba, Mg, Ca) metal salts are the most effective of the metal stearates.

Consequently, the above examples demonstrate that lower cost golf balls exhibiting similar or enhanced travel distance (i.e. higher C.O.R. values) with similar or improved plyability (i.e. hardness/softness) characteristics without a sacrifice in durability can be produced according to the present invention.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A golf ball comprising a core and a cover, wherein the cover consists essentially of 100 parts by weight of at least one ionomer resin and from above 25 to about 100 parts by weight of a metal stearate, wherein said ionomer resin is the reaction product of an olefin having from 2 to 8 carbon atoms and an unsaturated monocarboxylic acid having from 3 to 8 carbon atoms.

2. The golf ball of claim 1, wherein said metal stearate is selected from the group consisting of zinc stearate, barium stearate, calcium stearate and magnesium stearate.

3. The golf ball of claim 1, wherein said cover comprises of one of more additional ingredients selected from the group consisting of pigments, dyes, U.V. absorbers and optical brighteners.

4. The golf ball of claim 1, wherein said unsaturated monocarboxylic acid is a carboxylic acid selected from the group consisting of a acrylic acid and methacrylic acid.

5. The golf ball of claim 4, wherein the carboxylic acid groups of the ionomer resin are partially neutralized by sodium ions.

6. The golf ball of claim 4, wherein the carboxylic acid groups of the ionomer resin are partially neutralized by zinc ions.

7. A golf ball comprising a core and a cover, wherein the cover consists essentially of 100 parts by weight of at least one ionomer resin and from about 25 to about 75 parts by weight of a metal stearate, wherein said ionomer resin is the reaction product of an olefin having from 2 to 8 carbon atoms and an unsaturated monocarboxylic acid having from 3 to 8 carbon atoms.

8. The golf ball of claim 7, wherein said metal stearate is selected from the group consisting of zinc stearate, barium stearate, calcium stearate and magnesium stearate.

9. The golf ball of claim 7, wherein said cover comprises of one or more additional ingredients selected from the group consisting of pigments, dyes, U.V. absorbers and optical brighteners.

10. The golf ball of claim 7, wherein said unsaturated monocarboxylic acid is a carboxylic acid selected from the group consisting of acrylic acid and methacrylic acid.

11. The golf ball of claim 10, wherein the carboxylic acid groups of one of the ionomer resin are partially neutralized by sodium ions.

12. The golf ball of claim 10, wherein the carboxylic acid groups of one of the ionomer resins are partially neutralized by zinc ions.

13. A golf ball comprising a core and a cover, wherein the cover consists essentially of 100 parts by weight of one or more ionomer resins and from about 50 parts by weight of a metal stearate, wherein said ionomer resin is the reaction product of an olefin having from 2 to 8 carbon atoms and an unsaturated monocarboxylic acid having from 3 to 8 carbon atoms.

14. The golf ball of claim 13, wherein said metal stearate is selected from the group consisting of zinc stearate, barium stearate, calcium stearate and magnesium stearate.

15. The golf ball of claim 13, wherein said cover comprises of one or more additional ingredients selected from the group consisting of pigments, dyes, U.V. absorbers and optical brighteners.

16. The golf ball of claim 13, wherein the carboxylic acid groups of one of the ionomer resins are partially neutralized by sodium ions.

17. The golf ball of claim 13, wherein the carboxylic acid groups of one of the ionomer resins are partially neutralized by zinc ions.

18. In a golf ball cover composition consisting essentially of at least one ionomer resin, the improvement comprising the addition of from about 25 to about 100 parts by weight resin of a metal stearate, wherein said ionomer resin is the reaction product of an olefin having from 2 to 8 carbon atoms and an unsaturated monocarboxylic acid having from 3 to 8 carbon atoms.

19. The golf ball cover of claim 18, wherein said metal stearate is selected from the group consisting of zinc stearate, barium stearate, calcium stearate and magnesium stearate.

* * * * *